United States Patent
Simkins et al.

(12)

(10) Patent No.: US 6,802,884 B2
(45) Date of Patent: Oct. 12, 2004

(54) TANTALUM-SILICON AND NIOBIUM-SILICON SUBSTRATES FOR CAPACITOR ANODES

(75) Inventors: Leah Simkins, Waltham, MA (US); Anastasia Conlon, Canton, MA (US)

(73) Assignee: H.C. Starck, Inc., Newton, MA (US)

( * ) Notice: Subject to any disclaimer, the term of this patent is extended or adjusted under 35 U.S.C. 154(b) by 0 days.

(21) Appl. No.: 10/074,073

(22) Filed: May 21, 2002

(65) Prior Publication Data

US 2003/0217619 A1 Nov. 27, 2003

(51) Int. Cl.$^7$ .................................................. B22F 3/00
(52) U.S. Cl. ........................................ 75/245; 361/529
(58) Field of Search .............................. 75/245; 361/529

(56) References Cited

U.S. PATENT DOCUMENTS 6,423,110 B1 * 7/2002 Naito et al. .................... 75/232

* cited by examiner

*Primary Examiner*—Ngoclan T. Mai
(74) *Attorney, Agent, or Firm*—Godfried R. Akorli; Diderico van Eyl (57) ABSTRACT

The allows: Ta—Si, Nb—Si, TaN—Si, NbN—Si and variants are used as enhanced powder anode substrates for electrolytic capacitor anodes (sintered powder masses) with dielectric oxide formation at walls of the internal pores.

6 Claims, 6 Drawing Sheets

TANTALUM-SILICON AND NIOBIUM-SILICON SUBSTRATES FOR CAPACITOR ANODES

FIELD AND BACKGROUND OF THE INVENTION

The present invention relates to substrates for high dielectric constant capacitors and more particularly powder substrates based on tantalum and/or niobium fabricated into porous masses that are electrolytically "formed" to establish a thin oxide of tantalum and/or niobium (normally tantalum and/or niobium pentoxide) as the dielectric layer. These are utilized with well known solid or wet electrolyte systems.

The tantalum/niobium powder substrates (primarily tantalum) have been utilized for over half a Century as materials of choice for highest capacitance, compact capacitors with low leakage, low electrical series resistance and high voltage breakdown levels, standing up well to demanding usage and quality control life tests of military, computer and telecommunications markets.

The state of the art capacitance level for electrolytic capacitors has moved up in the last decade from under 10,000 micro-farad volts per gram to over 50,000 through shrinkage of powder substrate size (with greater surface area of formed oxide in relation to weight and volume of the anodes, anode porosity control for greater effective access to the expanded area, sinter controls, doping of the substrate with phosphorous and in some instances nitrogen, silicon, or sulfur. Improvements in lead wire production, lead wire to anode bonding, forming routines, electrolytic systems and packaging have also been made.

However, these advanced high capacitance systems have produced new expectations as to leakage, series resistance, bias dependence, thermal stability generally, in capacitor production and usage, frequency stability, voltage breakdown and overall stability that have not been met or are only met with high yield losses. Nitrided Ta, Nb and other forms of Ta, Nb modification have helped with stability as well as capacitance but insufficiently in relation to expectations.

It is a principal object of the invention to provide a capacitor substrate system affording improved leakage, series resistance, bias dependence, thermal stability generally in capacitor production and usage, frequency stability, increased porosity leading to lower equivalent series resistance ("ESR") and low dissipation factor ("DF"), in relation to high CV/gram systems (30,000 and higher).

It is a related object to achieve such stability reliably and in high yields.

SUMMARY OF THE INVENTION

The objects of the invention are met through new tantalum-silicon and niobium-silicon systems preferably formed as mixtures of 90–98 wgt-% Ta, Nb and 2–10 wgt-% of Si powders mixed together. One can also add Si to a reactor for Na reduction of $K_2TaF_7$. One can also use Si based wetting agents in suspensions of Ta as a means of introducing Si to Ta in appropriate amounts and forms.

Enhancement (lowering) of bias dependence after heat treatment has been achieved and can be achieved reliably through the Ta—Si substrate system and such result is now reasonably projected for similar Ta/Nb—Si substrate systems. Electrolytic porous anode capacitors made with such systems can afford stable performance at high voltage formations, and under conditions of high frequency usage.

The benefits of the present invention can also be realized in Ta/Nb-nitride systems and in systems of Si with Ta/Nb, Ta/Nb-nitride doped with known capacitance enhancing impurities such as P, Si, S.

The benefits of silicon addition include pore size control of sintered anodes and optimized porosity with generally larger pores and greater uniformity of pore size to enable a more certain effective electrolyte precursor access, effective electrolyte conduction paths and less degradation of capacitor performance associated with varying porosity.

One method to distribute Si homogeneously throughout produced Ta or Nb is by use of liquid organo-silicon compounds. Due to the desire for reduced oxygen and carbon content, the preferred organo-silicon compound would be in the silicone family. These compounds which are primarily made up of SiOH bonds will decompose during the high temperature treatment of the powders to Si in a reducing atmosphere.

The reducing atmosphere may be provided in the standard technology of the field but it is preferred to be Mg or $H_2$, or NH to minimize contamination.

Other objects, features and advantages will be apparent from the following detailed description of preferred embodiments taken in conjunction with the accompanying drawings in which:

BRIEF DESCRIPTION OF PREFERRED EMBODIMENTS

U.S. patent ("USP") U.S. Pat. No. 4,432,035 dated Feb. 14, 1984 of Hsieh (IBM) discloses $Ta_9Si_2$ (in lieu of previously tried $Ta_2Si$) in thin film capacitors but has never afforded the art a path to useful powder substrates for sintered electrolytic capacitor anodes.

The present invention starts from a separate path of recognizing, from the work of T. Tripp et al. U.S. Pat. No. 4,957,541 (capacitor grade tantalum powder; see also, references cited therein), the proper role of tantalum nitride in affording a new series of useful powder substrates.

EXAMPLE 1

Initial tests showed leakage of Ta—Si powder substrate systems about similar to Ta powder substrate systems (no gain) but capacitance was enhanced for Ta—Si vs. Ta even at higher sinter temperature for the Ta—Si and slightly lower at lower sinter temperatures. It appeared that the Si was acting as a sinter retardant.

The tests involved four-pellet-group averaging for each of Ta, Ta—Si systems. The Ta was a standard product 50K-9010 made from sodium reduced potassium heptafluorotantalate with artifacts of leaching, fine sizing, doping and deoxidization well known in the art. The Ta—Si was prepared by blending 0.333 gm of 60 mesh 99.999% pure Si powder with 9.667 gm of the 50K-9010 Ta powder, to approximate $Ta_9Si_2$.

Powders of both systems were pressed into pellets and sintered at 1500° C. for first sets of pellets formed at 16, 30, 40, 50, 80 and 100 volts-formation Voltage, Vf, and second sets sintered at various temperatures from 1,350 to 1,550° C.

Conditions of preparation and experimental results are tabulated as follows:

TABLE I

Summary of pellet preparation, formation and testing conditions

| Condition | Value(s) |
|---|---|
| Pellet Mass (g) | 0.14 |
| Press Density (g/cc) | 5.0 |
| Sintering Temperature (° C.) | 1350, 1450, 1550 |
| Sintering Time (minutes) | 20 |
| Formation Temperature (° C.) | 80 |
| Formation Voltage (V) | 16, 30, 40, 50, 80, 100, 120 |
| Formation Current (mA/g) | 100 |
| Hold Time (hrs) | 2 hrs. or 5 minutes |
| Formation Electrolyte | 0.1 V/V % $H_3PO_4$ |
| DCL Test Voltage (% $V_f$) | 70 |
| Bias Voltage (v) | 0–20 V |
| DLC Soak Time (minutes) | 5 |

TABLE II

Electrical Results for Tantalum Silicon Blend (held for 5 minutes)

| Formation Voltage | 1500° C. CV/g 9 $\mu F \cdot V/g$ | 1500° C. L/C (nA/$\mu F \cdot V$) |
|---|---|---|
| 16 | 32,400 | 0.884 |
| 30 | 25,100 | 0.422 |
| 40 | 24,300 | 0.385 |
| 50 | 23,800 | 0.560 |
| 80 | 23,000 | 3.576 |
| 100 | 22,500 | 2.326 |

TABLE III

Capacitance ($\mu F \cdot V/g$)

| Sinter Temperature | 50K-9010 50 Vf | LFS-001 50 Vf | 50K-9010 120 Vf | LFS-001 120 Vf |
|---|---|---|---|---|
| 1350 | 41,500 | 31,400 | | |
| 1450 | 30,600 | 24,300 | 19,000 | 20,900 |
| 1550 | 16,100 | 19,300 | | |

TABLE IV

Leakage (nA/$\mu F \cdot V/g$)

| Sinter Temperature | 50K-9010 50 Vf | LFS-001 50 Vf | 50K-9010 120 Vf | LFS-001 120 Vf |
|---|---|---|---|---|
| 1350 | 0.322 | 0.512 | | |
| 1450 | 0.275 | 0.249 | 0.608 | 0.946 |
| 1550 | 0.067 | 0.065 | | |

TABLE V

140 Volt formation Capacitance ($\mu F \cdot V/g$) and Leakage (nA/$\mu F \cdot V/g$)

| Sinter Temperature | 50K-9010 Capacitance | LFS001 Capacitance | 50K-9010 L/C | LFS-001 L/C |
|---|---|---|---|---|
| 1450 | 16,900 | 16,000 | 1.230 | 0.960 |
| 1500 | | 18,600 | | 0.500 |

Figure 1:
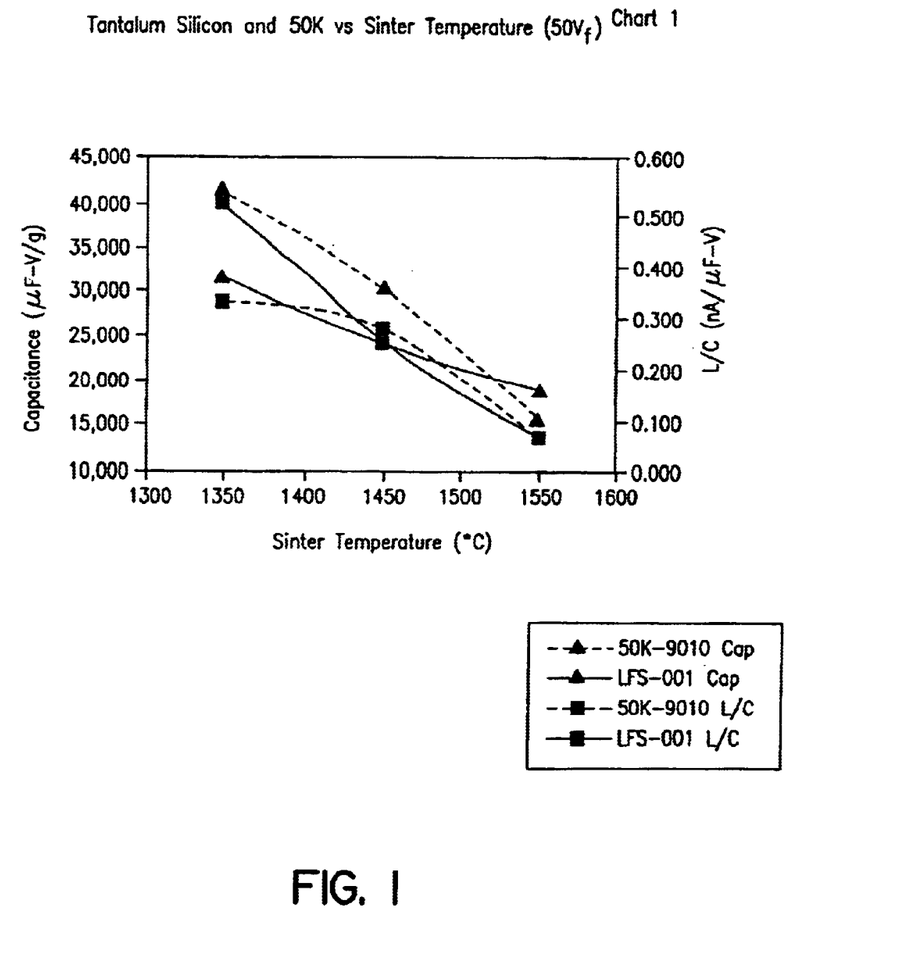
FIG. 1 is a graph of capacitance Ta—Si vs. high capacitance type of Ta (50K) capacitor with sintering at various temperatures from 1300 to 1550° C.
Figure 2:
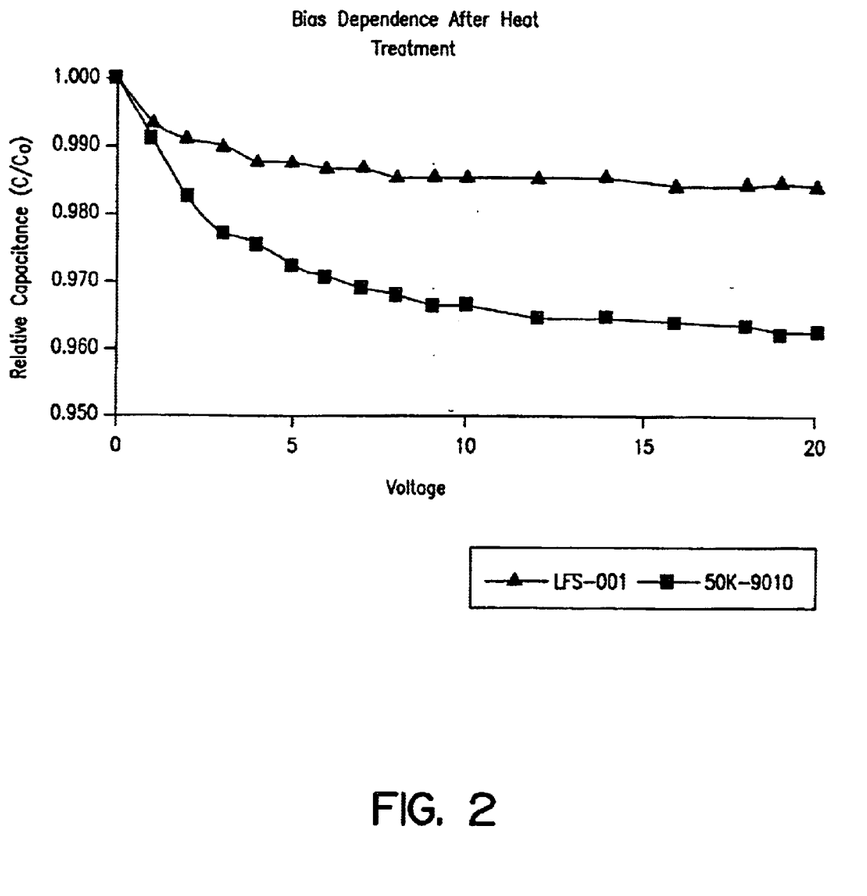
FIG. 2 compares similar materials as to bias dependence at various test bias voltages.

The results are shown graphically in FIG. 1 where capacitance of the Ta—Si powder substrate capacitors (LFS) is seen to be in the same range as the Ta powder substrate capacitors (50K) but shows lesser decline at increasing sinter temperatures, a number of enhanced stability and rates of retardance but ambiguous, given closeness of the values.

EXAMPLE 2

Further samples were prepared as in Example 1 but extending to Ta—Si, TaN—Si, and Ta—$Si_3N_4$:

0.333 gm 60M 99.999% Si with 9.667 gm 50K-9010;

0.3106 gm 60M 99.999% Si with 9.689 gm TaN-003

0.545 gm $Si_3N_4$ with 9.456 gm 50K-9010

0.507 gm $Si_3N_4$ with 9.43 gm TaN-003

All mixtures had a Ta/Si ratio of 9/2.

Also included as controls were:

pure TaN-003 pure 50K-9010

Conditions of experimental procedure and results are set forth in Tables VI–VII.

TABLE VI

Summary of pellet preparation, formation and testing conditions

| Condition | Value(s) |
|---|---|
| Pellet Mass (g) | 0.14 |
| Press Density (g/cc) | 5.0 |
| Sintering Temperature (° C.) | 1350, 1450, 1550 |
| Sintering Time (minutes) | 20 |
| Formation Temperature (° C.) | 80 |
| Formation Voltage (V) | 50, 120 |
| Formation Current (mA/g) | 100 |
| Hold Time (hrs) | 2 hrs. |
| Formation Electrolyte | 0.1 V/V % $H_3PO_4$ |
| DCL Test Voltage (% $V_f$) | 70 |
| Bias Voltage (v) | 0–20 V |
| DLC Soak Time (minutes) | 5 |

TABLE VII

Capacitance (mF · V/g)

| Sinter Temperature | 50K-9010 | TaN-003 | Ta + Si | TaN + Si | TaN + Si₃N4 | Ta + Si₃N₄ |
|---|---|---|---|---|---|---|
| 1350 | 40,959 | 31,220 | 31,666 | 33,985 | 31,194 | 30,643 |
| 1450 | 29,260 | 30,643 | 23,581 | 30,608 | 29,946 | 25,594 |
| 1550 | 14,910 | 26,714 | 17,588 | 26,828 | 25,253 | 19,915 |
| 1450–00 Vf | 18,564 | — | 21,336 | 18,398 | 18,060 | 14,318 |

TABLE VIII

Leakage (nA/mF · V)

| Sinter Temperature | 50K-9010 50 Vf | TaN-003 | Ta + Si | TaN + Si | N + Si3N₄ |
|---|---|---|---|---|---|
| 1350 | 0.272 | 0.881 | 0.565 | 1.006 | 41.900 |
| 1450 | 0.064 | 1.079 | 0.458 | 0.434 | 6.726 |
| 1550 | 0.062 | 0.954 | 0.058 | 0.164 | 0.157 |
| 1450–100 Vf | 0.701 | — | 0.880 | 1.332 | 11.413 |

The results are shown graphically in FIGS. 3–8.

Figure 3:
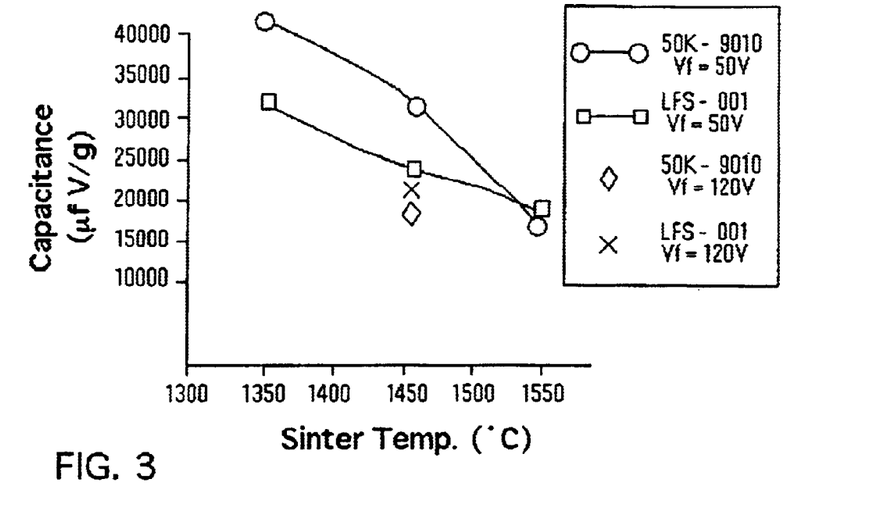
FIGS. 3–4 trace capacitance and leakage vs. sinter temperature (similarly to FIG. 1) comparing Ta—Si with Ta and also with TaN+Si.
Figure 4:
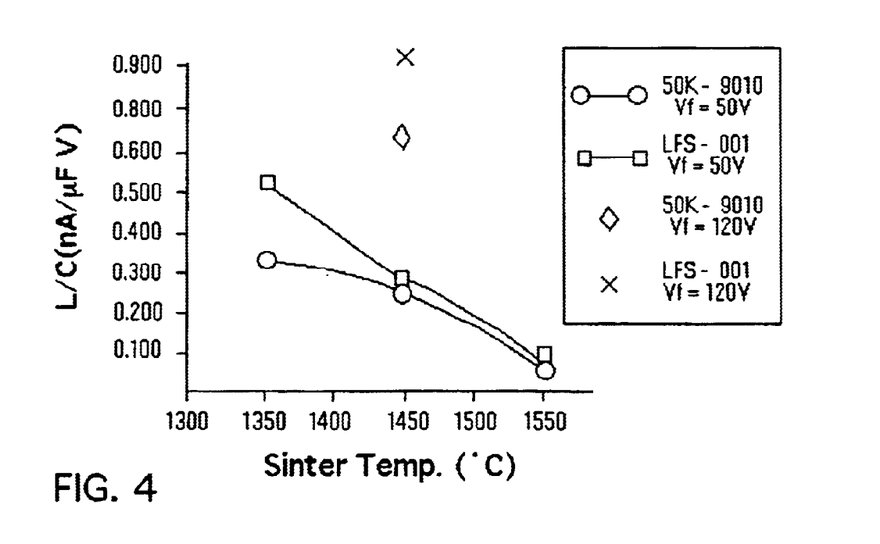

FIGS. 3–4 show TaN and TaN—Si with lowest cap' loss within varying sinter temperature, but with leakage enhancement (lowering) for TaN—Si at increasing sinter temperatures. A favorable balance of characteristics of Ta—Si is also shown.

Figure 5:
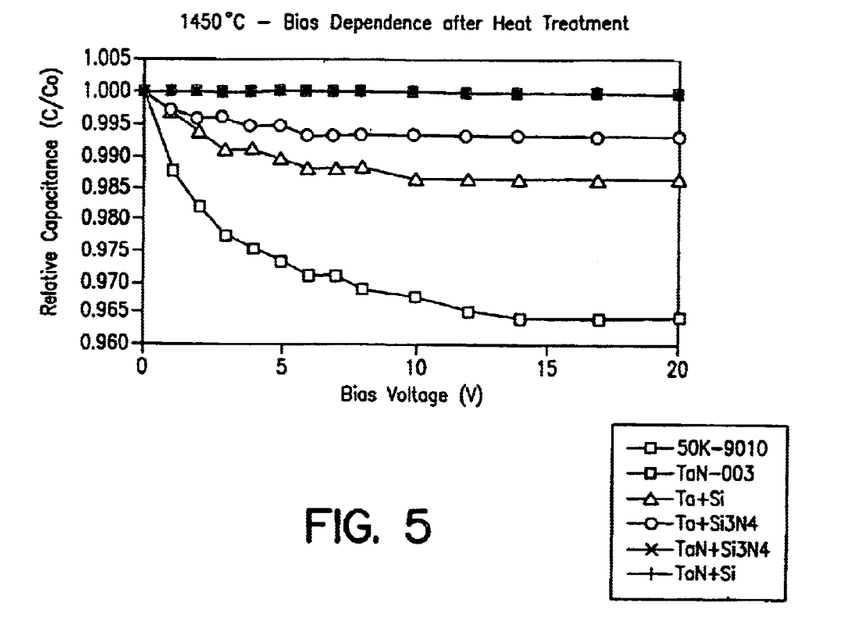
FIGS. 5–6 compare (similarly to FIG. 2) bias dependence of Ta, Ta—Si, Ta+$Si_3N_4$, TaN—$Si_3N_4$ and TaN—Si.
Figure 6:
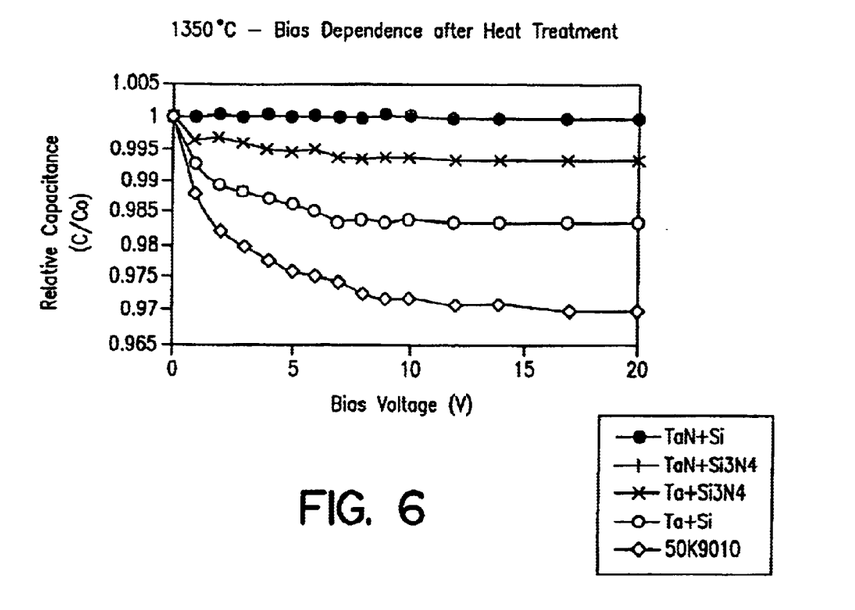

FIGS. 5–6 show (on 1450° C. and 1350° C. sintered test products) that at various bias voltages from 0 to 20 volts capacitance declines most at increasing bias for Ta, much less for Ta—Si and still less for Ta—Si₃N₄ and lease for TaN—Si.

Figure 7:
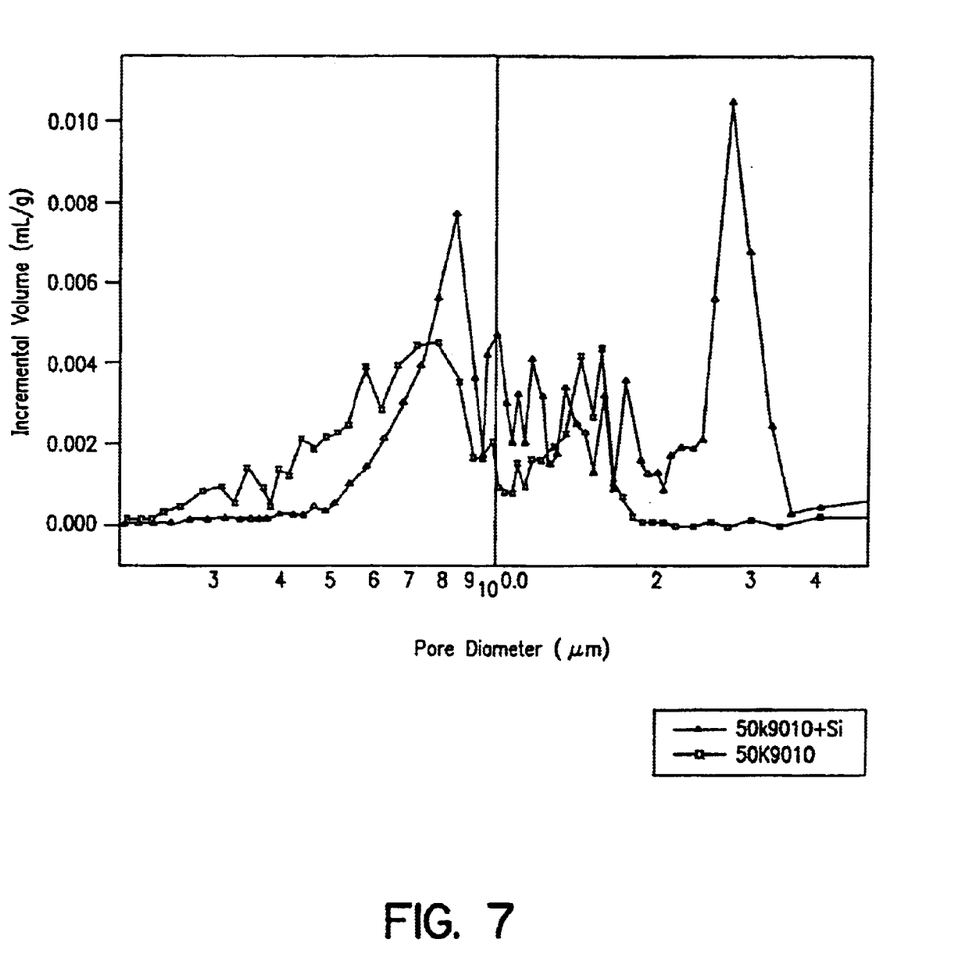
FIGS. 7–8 compare incremental volume vs. pore diameter characteristics for Ta vs. Ta—Si, and TaN vs. TaN—Si.
Figure 8:
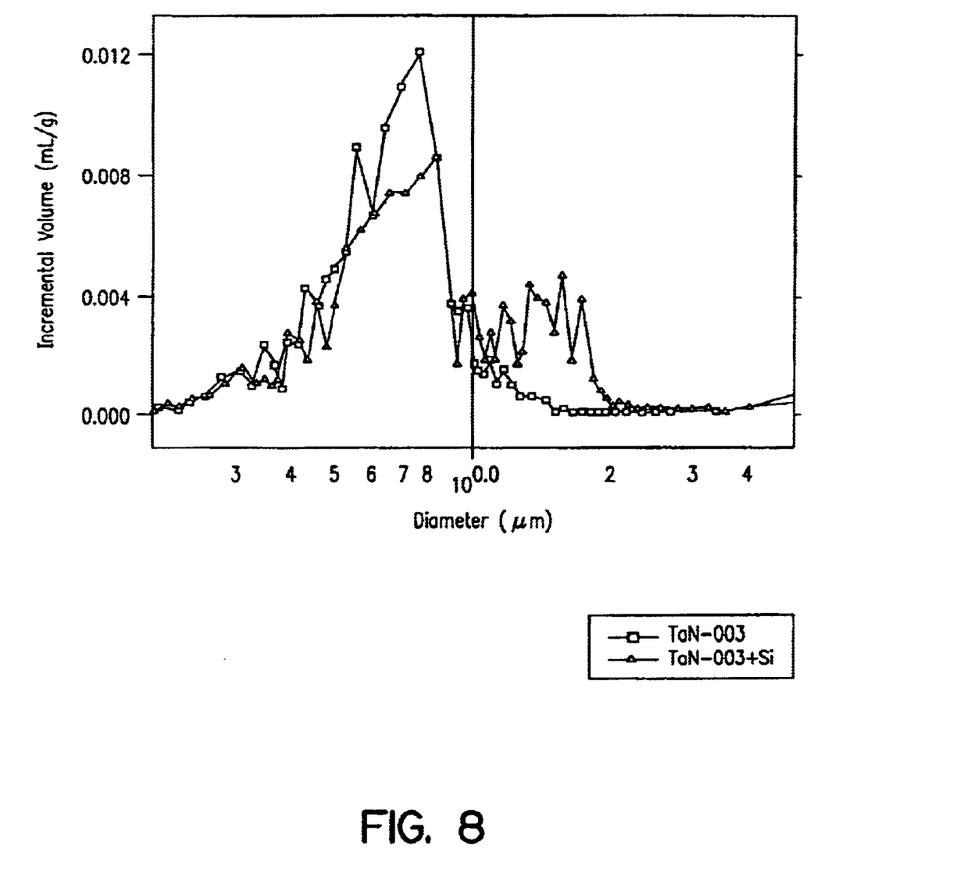

FIGS. 7–8 with porosmetry testing results show incremental volume vs. pore diameter benefit for Ta—Si vs. Ta (FIG. 7) and TaN—Si (FIG. 8). This can lead to a reduction of electrical series resistance and improved performance in high frequency usage.

The overall results indicate a need.

EXAMPLE 3

Niobium Silicon (Nb—Si) (Nb—Si_ systems were also processed as for Ta above. These behaved differently than the Ta—Si system. There wasn't an improvement on thermal stability and bias dependence, but something different was observed. There was an overall increase in capacitance with the addition of about 1% Si. There was also a decrease in leakage. The % increase in capacitance arose with increasing sinter temperature, decreased in L/C and remained stable generally.

TABLE IX

| Sinter Temperature | % Increase Capacitance | % Decrease L/C |
|---|---|---|
| 1100° C. | 1% | 41% |
| 1200° C. | 4% | 36% |
| 1300° C. | 25% | 33% |

There was an increase in porosity in Nb as seen in Ta, but the sample used had very good porosity to begin with so no significant decrease in ESR was seen. X-Ray was done on a sintered Ta—Si mixture pellet and the result was that an alloy was actually made and there was not just a mixture.

Discussion

The present invention establishes uniquely and surprisingly a distinct change of Ta—Si (and/or TaN—Si) powder substrate sinter characteristic vs. Ta (or TaN) that can be tied to higher quality sinter temperature to emerge with beneficial high capacitance, low leakage capacitors with various areas of enhanced stability as to voltage bias, ESR frequency, heat treatment.

EXAMPLE 4

Silanes were used to add silicon to tantalum as described below in parts (a) and (b), below, and the resultant silicon doped tantalum tested with results as indicated at (c).

(a) APST

Tantalum powders were wet with an aqueous solution of APST—amino propyl silane, triol, i.e. $C_3H_{11}NO_3Si$, as a means of adding silicon and nitrogen dopants to the powder. The doping was done at a level necessary to generate 500 ppm of silicon. The tantalum used was a typical 50,000 CV/gm class powder (50 K). This level of doping, theoretically should have generated an additional 249 ppm of nitrogen to the powder, a desired result. APST is water soluble, and hence can be added with conventional phosphorous additive using techniques well known to those skilled in the art. In this Example, the powder was in fact simultaneously doped with 100 ppm phosphorous dissolved in the same solution. After doping addition, the powder was dried, and then thermally treated (agglomerated) at 1320° C. for 30 minutes under vacuum.

(b) THSMP

Tantalum powders were wet with an aqueous solution of THSMP—sodium 3-trihydrosilylmethylphosphonate, i.e. $PC_4H_{12}NaO_6Si$, as a means of adding silicon and phosphorous dopants, at a level to generate about 500 ppm of silicon. Again, the tantalum powder used was a typical 50,000 CV/gm class powder. This level of dopant would be expected to provide an additional level of 550 ppm phosphorus, a relatively high level of phosphorous for this type powder. Hence, no additional phosphorous was added. Like APST, THSMP is water soluble, and also can be added using the typical methods to add phosphorous known to those skilled in the art. After addition and drying, the powder was thermally treated under the same conditions as the APST sample.

(c) Test Results

The doped powders of (a) and (b) were tested for surface area (SA, sq. cm./gm), Scott Bulk Density (SBD, cc/gm), Fisher Average Particle Diameter (FAPD, microns), Flow (gm/sec.), carbon (C) content in ppm and similarly content of nitrogen (N), oxygen (O), phosphorus (P) and silicon (Si)

and the results are shown in Table X, below for APST and THSMP treated powders, with the base 50K tantalum powder as a control similarly tested. The pick-up of silicon and nitrogen was very accurate (corresponding closely to calculated) and less so for phosphorus but that had been provided in excess in any event, as indicated too by the higher surface of the 50K+THSMP sample compared to the others. Sodium added via the THSMP was substantially dissipated in the thermal agglomeration after-treatment

TABLE X

| Powder | SA | SBD | FAPD | Flow | C | N | O | P | Si |
|---|---|---|---|---|---|---|---|---|---|
| 50K | 9172 | 27.2 | 2.64 | 0.384 | 32 | 60 | 10330 | 92 | 71 |
| 50K + APST | 10097 | 27.3 | 2.76 | 0.396 | 365 | 256 | 11010 | 78 | 405 |
| 50K + THSMP | 11423 | 24.3 | 1.7 | 0.211 | 652 | 65 | 11880 | 317 | 500 |

The same powders, as agglomerated, were tested in a Malvern Mastersizer particle size measuring instrument utilizing laser diffraction measurements of particles suspended in an aqueous bath and results appear in Table XI, below. The tabulated results are shown for each of the 50K control, powder as treated with APST and with THSMP, the particle size of agglomerated particles at up to 10, 50, 90 wgt-% fractions, median value (MV) in microns, calculated surface area (CS) in sq. m/gm, and wgt-% of 11 micron and under fines (fine particles). It is seen that the doping served as a significant sinter retardant in both the APST and THSMP cases.

Table XI

TABLE XI

| Powder | 10% | 50% | 90% | MV | CS | 11 microns |
|---|---|---|---|---|---|---|
| 50K | 13.4 | 53.7 | 149.26 | 69.923 | 0.211 | 7.51 |
| 50K + APST | 16.9 | 77.89 | 214.94 | 103.4 | 0.17 | 5.62 |
| 50K + THSMP | 8.68 | 58.52 | 177.28 | 78.051 | 0.297 | 12.73 |

Despite the sodium present in the THSMP after vacuum thermal treatment, the Na present in the sample 50K+ THSMP was comparable to the control. It can also be noted that even though the silicon is introduced in a compound form, it is converted to elemental form in the course of thermal treatment for agglomeration and alloyed with the host tantalum.

It should be understood that similar effects are to be expected if similar silicon doping is applied to niobium, alloys of either tantalum or niobium, including alloying with each other, and compounds of one or both of these metals including nitrides and sub-nitrides. Still further silicon containing compounds and solutions (e.g., water glass) can be utilized to provide benefits of silicon doping as described above and if desired to also provide secondary benefits of other dopants—e.g. nitrogen and/or phosphorous doping.

The agglomerated particles (or resultant anode compacts) can be subjected to known per se deoxidation treatments such as exposure to vapors of alkali or alkaline earth metals or aluminum, preferably magnesium or calcium, while heating the powders at 600–1200° C. preferably above 800° C. as taught, e.g. in W. W. Albrecht et al., U.S. Pat. No. 4,483,819, granted Jul. 19, 1982, and U.S. Pat. No. 4,537,641, granted Aug. 27, 1985. The deoxidation heating also provides a way of advancing the conversion of silicon compounds to elemental silicon and its alloying with the host refractory metal. Deoxidation can be applied during the thermal agglomeration (reactive agglomeration). Often the deoxidation is followed by a treatment with an inorganic acid to remove residue of the reduction reaction (e.g. magnesium oxide). It is also known per se that other impurities of the host refractory metal can be removed by the deoxidation process and that thermal agglomeration temperatures can be reduced because of such process. The combination of chemical and thermal factors of the doping, agglomeration, deoxidation and eventual sintering stops can be optimized for each situation of doping with silicon, alone or with other additives, to improve physical and electrical properties of the capacitors made with porous anode compacts made from such agglomerated powders.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A substrate system comprising a mixture of (i) a refractory metal component selected from the group consisting of tantalum powders, tantalum nitride powders, niobium powders, niobium nitride powders and (ii) a silicon component, wherein (a) the system has a capacitance that is at least 10,000 CV and (b) the silicon is present in an amount that is at least 500 ppm, wherein the silicon is present in an amount ranging from 2 to 10 wt. %

2. A substrate system comprising a mixture of (i) a refractory metal component selected from the group consisting of tantalum powders, tantalum nitride powders, niobium powders, niobium nitride powders and (ii) a silicon component, wherein (a) the system has a capacitance that is at least 10,000 CV and (b) the silicon is present in an amount that is at least 500 ppm,
wherein the refractoty metal component is present in an amount ranging from 90 to 98 wt. %.

3. A substrate system comprising a mixture of (i) a refractory metal component selected from the group consisting of tantalum powders, tantalum nitride powders, niobium powders, niobium nitride powders and (ii) a silicon component, wherein (a) the system has a capacitance that is at least 10,000 CV and (b) the silicon is present in an amount that is at least 500 ppm,
wherein the substrate system has capacitance is that is at least 30,000 CV.

4. A substrate system comprising a mixture of (i) a refractory metal component selected from the group consisting of tantalum powders, tantalum nitride powders, niobium powders, niobium nitride powders, the refractory metal component being present in an amount ranging from 90 to 98 wt. % and (ii) a silicon component, wherein (a) the system has a capacitance that is at least 10,000 CV and (b) the silicon is present in an amount ranging from 2 to 10 wt. %.

5. The substrate system of claim 4, wherein the substrate system has capacitance is that is at least 30,000 CV.

6. A substrate system comprising a mixture of (i) a refractory metal component selected from the group consisting of tantalum powders, tantalum nitnde powders, niobium powders, niobium nitride powders and (i) a silicon component, wherein (a) the system has a capacitance that is at least 10,000 CV and (b) the silicon is present in an amount that is at least 500 ppm, wherein the tantalum or the niobium is present in an amount ranging from 90 to 98 wt. %.

* * * * *